US 008294015B2

(12) United States Patent
Canis et al.

(10) Patent No.: US 8,294,015 B2
(45) Date of Patent: Oct. 23, 2012

(54) METHOD AND SYSTEM FOR UTILIZING A GAMING INSTRUMENT CONTROLLER

(76) Inventors: Randy Lawrence Canis, Chesterfield, MO (US); Timothy Burton Clise, Edina, MN (US)

( * ) Notice: Subject to any disclaimer, the term of this patent is extended or adjusted under 35 U.S.C. 154(b) by 1160 days.

(21) Appl. No.: 12/143,330

(22) Filed: Jun. 20, 2008

(65) Prior Publication Data

US 2009/0318226 A1 Dec. 24, 2009

(51) Int. Cl.
*A63H 5/00* (2006.01)
*G04B 13/00* (2006.01)
*G10H 7/00* (2006.01)
(52) U.S. Cl. .......................................... 84/609; 84/645
(58) Field of Classification Search ............... 434/307 A; 84/609
See application file for complete search history.

(56) References Cited

U.S. PATENT DOCUMENTS

| | | | |
|---|---|---|---|
| 4,580,479 A | 4/1986 | Bonanno | |
| 5,214,231 A | 5/1993 | Ernst et al. | |
| 5,670,729 A | 9/1997 | Miller et al. | |
| 5,739,455 A | 4/1998 | Poon | |
| 5,739,457 A | 4/1998 | Devecka | |
| 5,769,719 A | 6/1998 | Hsu | |
| 5,773,742 A | 6/1998 | Eventoff et al. | |
| 5,990,405 A | 11/1999 | Auten et al. | |
| 6,018,121 A | 1/2000 | Devecka | |
| 6,225,547 B1 | 5/2001 | Toyama et al. | |
| 6,245,982 B1 | 6/2001 | Suzuki et al. | |
| 6,347,998 B1 | 2/2002 | Yoshitomi et al. | |
| 6,362,411 B1 | 3/2002 | Suzuki et al. | |
| 6,369,313 B2 | 4/2002 | Devecka | |
| 6,390,923 B1 | 5/2002 | Yoshitomi et al. | |
| 6,425,822 B1 | 7/2002 | Hayashida et al. | |
| 6,429,863 B1 | 8/2002 | LoPiccolo et al. | |
| 6,495,748 B1 | 12/2002 | Wang et al. | |
| 6,645,067 B1 | 11/2003 | Okita et al. | |
| 6,835,887 B2 | 12/2004 | Devecka | |
| 7,009,100 B2 | 3/2006 | Ando | |
| 7,151,214 B2 | 12/2006 | Barry | |
| 7,184,557 B2 | 2/2007 | Berson | |
| D569,382 S | 5/2008 | Yow et al. | |
| 7,435,178 B1 | 10/2008 | Tam et al. | |
| 7,799,984 B2 * | 9/2010 | Salter | 84/477 R |
| 7,851,689 B2 * | 12/2010 | Reynolds et al. | 84/610 |
| 2002/0088337 A1 * | 7/2002 | Devecka | 84/743 |
| 2007/0163427 A1 * | 7/2007 | Rigopulos et al. | 84/609 |
| 2007/0243915 A1 * | 10/2007 | Egozy et al. | 463/7 |
| 2008/0113797 A1 * | 5/2008 | Egozy | 463/35 |

OTHER PUBLICATIONS

Rock Bank (video game) from Wikipedia, the free encyclopedia; http://en.wikipedia.org/wiki/Rock_Band_(video_game), Jun. 8, 2008.
Guitar Hero (series) from Wikipedia, the free encyclopedia; http://en.wikipedia.org/wiki/Guitar_Hero_(series), Jun. 8, 2008.

* cited by examiner

*Primary Examiner* — Jeffrey Donels
(74) *Attorney, Agent, or Firm* — Randy Canis; Timothy Clise

(57) ABSTRACT

Methods and systems for utilizing a gaming instrument controller are described. In one embodiment, a musical interaction recording of a song may be accessed. The musical interaction recording may include a backing audible portion of the song and a user reproduction indication associated with the song. The user reproduction indication may be presented in synchronization with the song. A plurality of musical note selections may be received from a gaming instrument controller based on the presenting of the user reproduction indication. A plurality of musical notes for the song may be generated based on the receiving of the plurality of musical note selections. The backing audible portion and the plurality of musical notes may be reproduced.

21 Claims, 6 Drawing Sheets

METHOD AND SYSTEM FOR UTILIZING A GAMING INSTRUMENT CONTROLLER

BACKGROUND

A user may operate a gaming instrument controller to play along with a prerecorded song. The user may score points and advance in the game based on the accuracy of selecting the notes of the prerecorded song.

BRIEF DESCRIPTION OF THE DRAWINGS

Some embodiments are illustrated by way of example and not limitation in the figures of the accompanying drawings in which.

DETAILED DESCRIPTION

Example methods and systems for utilizing a gaming instrument controller are described. In the following description, for purposes of explanation, numerous specific details are set forth in order to provide a thorough understanding of example embodiments. It will be evident, however, to one skilled in the art that embodiments of the present invention may be practiced without these specific details.

In an example embodiment, a musical interaction recording of a song may be accessed. The musical interaction recording may include a backing audible portion of the song and a user reproduction indication associated with the song. The user reproduction indication may be presented in synchronization with the song. A plurality of musical note selections may be received from a gaming instrument controller based on the presenting of the user reproduction indication. A plurality of musical notes for the song may be generated based on the receiving of the plurality of musical note selections. The backing audible portion and the plurality of musical notes may be reproduced.

Figure 1:
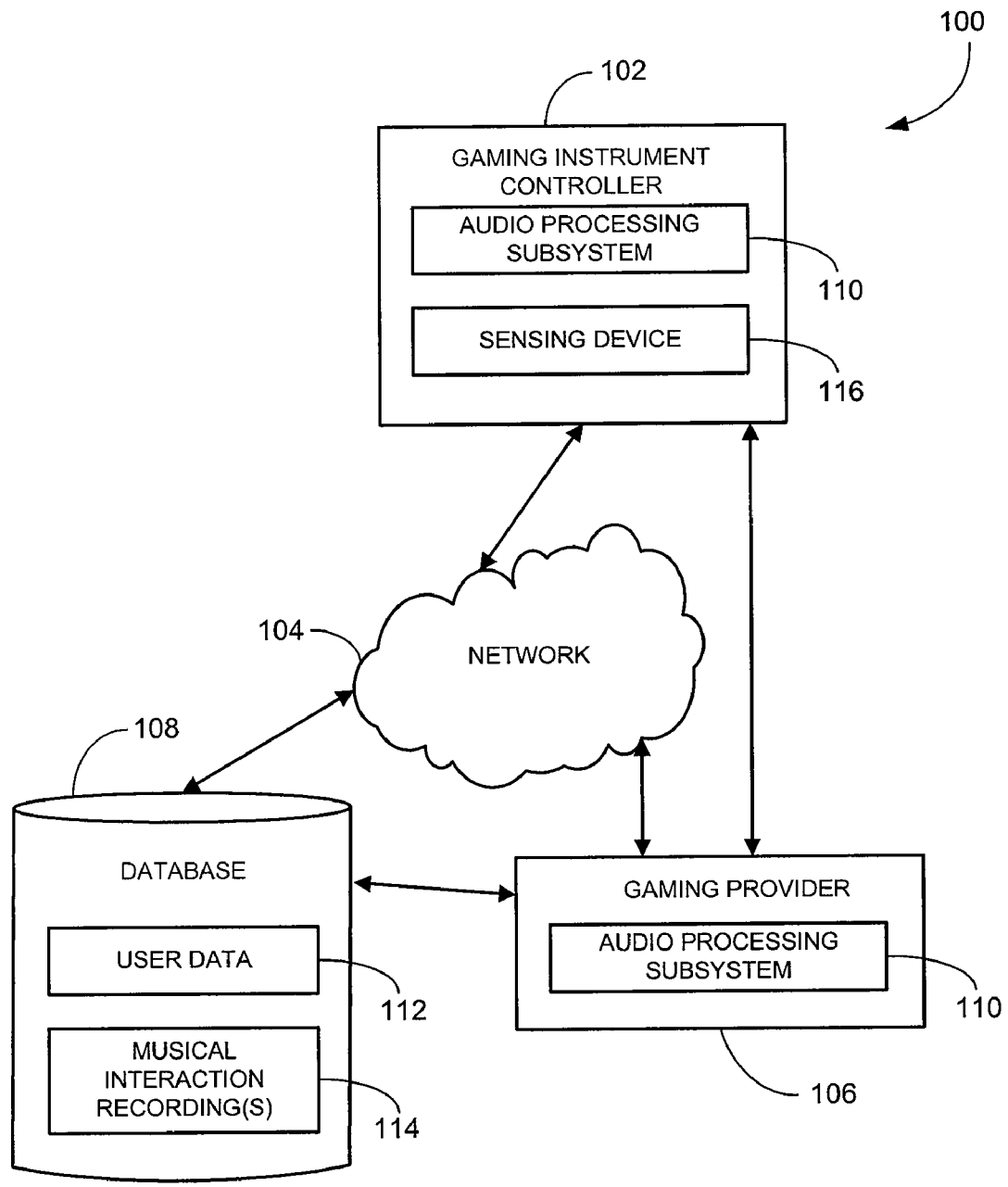
FIG. 1 is a block diagram of a system, according to an example embodiment.

FIG. 1 illustrates an example system 100 in which a gaming instrument controller 102 may be in communication with a gaming provider 106. A user may operate the gaming instrument controller 102, in an example embodiment, to play a game involving a song offered by the gaming provider 106 in which points are earned based on user performance and/or to play musical notes along with a backing audible portion of a song. The gaming instrument controller 102 may be otherwise used.

The gaming instrument controller 102 may further include a position or movement sensing device 116. Examples of the sensing devices 116 include a gyroscope or an infra-red position sensor. The sensing device 116 may produce output signals to control or assist in controlling the musical notes based on the position of the gaming instrument controller 102. For example, the notes that a user can reproduce using the gaming instrument controller 102 can move up or down the musical scale based on the physical position of the gaming instrument controller 102 through use of the sensing device 116. The musical notes may go up the musical scale as the gaming instrument controller 102 moves to the right and down the scale as the user moves to the left. The musical notes may go up the musical scale by raising the gaming instrument controller 102. The musical notes may go down the musical scale by lowering the gaming instrument controller 102. The user may further step up the musically scale by quickly raising the neck of the gaming instrument controller 102. In another example, the musical notes produced by the gaming instrument controller 102 may change along the musical scale as the gaming instrument controller 102 moves toward or away from the receiver of the signals from the gaming instrument controller 102 (e.g., the gaming provider 106).

The gaming instrument controller 102 may be connected to the gaming provider 106 locally through a wire or wirelessly and/or remotely over a network 104. The network 104 over which the gaming instrument controller 102 and the gaming provider 106 may be in communication may include a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The gaming provider 106 may operate on a gaming counsel including a SONY PLAYSTATION, a NINTENDO WII, NINTENDO DS, or a different gaming counsel. The gaming provider 106 may operate on a network resource (e.g., a website). The gaming provider 106 may operated otherwise. In an example embodiment, the gaming provider 106 may be based on GUITAR HERO by ACTIVISION, ROCKBAND by HARMONIX MUSIC SYSTEMS, or may be otherwise based or developer for another gaming provider.

An audio processing subsystem 110 may be deployed within the gaming instrument controller 102 and/or the gaming provider 106 to enable a user to play a game and/or to play musical notes through use of the gaming instrument controller 102.

A database 108 may retain user data 112 and/or one or more musical interaction recordings 114. The user data 112 may be retained in the database 108 to store information regarding the use of the gaming instrument controller 102 by a user. A musical interaction recording 114 may include a backing audible portion of a song and a user reproduction indication associated with the song with which the user may participate by operating the gaming instrument controller 102. The user reproduction indication may indicate to the user how to operate the gaming instrument controller 102.

Figure 2:
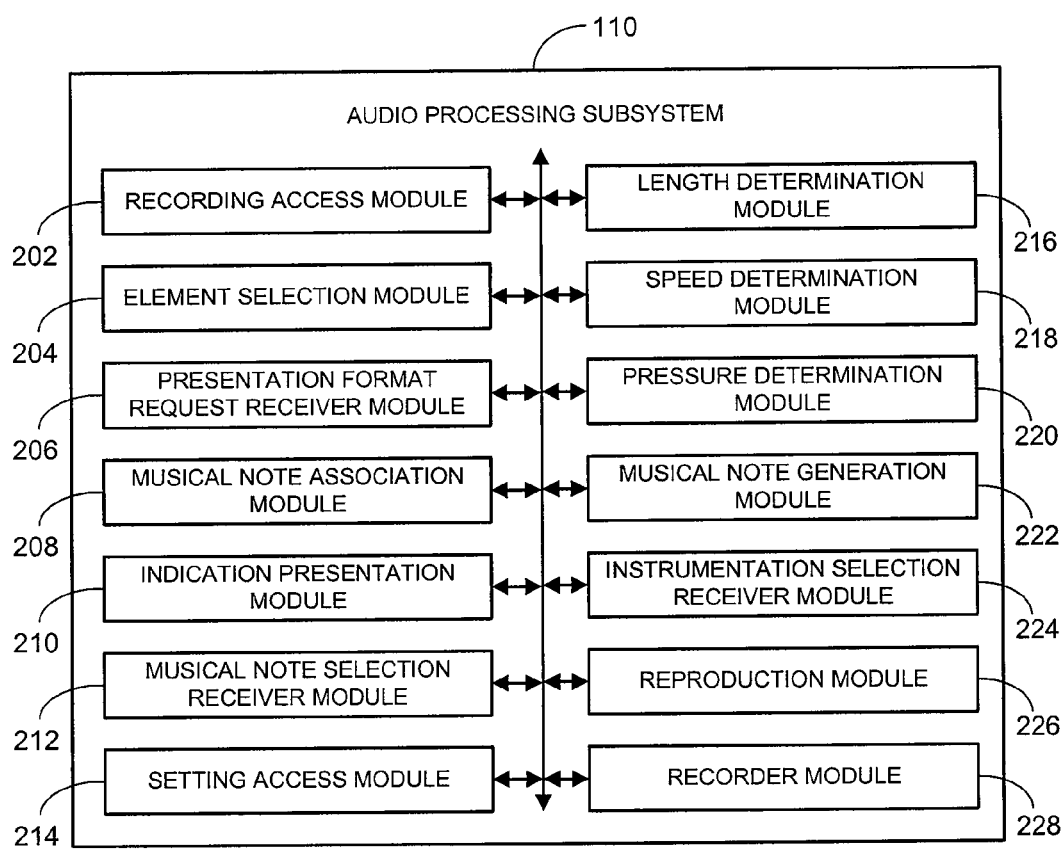
FIG. 2 is a block diagram of an example audio processing subsystem that may be deployed within the system of FIG. 1 according to an example embodiment.

FIG. 2 illustrates an example audio processing subsystem 110 that may be deployed in the gaming instrument controller 102 and/or the gaming provider 106 of the system 100 (see FIG. 1) or otherwise deployed in another system. The audio processing subsystem 110 may include a recording access module 202, an element selection module 204, a presentation format request receiver module 206, a musical note association module 208, an indication presentation module 210, a musical note selection receiver module 212, a setting access module 214, a length determination module 216, a speed determination module 218, a pressure determination module 220, a musical note generation module 222, an instrumentation selection receiver module 224, a reproduction module 226, and/or an recorder module 228. Other modules may also be included.

The recording access module 202 accesses the musical interaction recording 114 of a song. The musical interaction recording 114 may include a backing audible portion of the song and a user reproduction indication associated with the song. The user reproduction indication may include an audible user reproduction indication, a visual user reproduction indication, or the like.

The element selection module 204 receives multiple song element selections, receives an element order selection, and/or groups the song element selections together to form a song order for the song.

The presentation format request receiver module 206 receives a presentation format request for the musical interaction recording 114. The presentation format request may include, by way of example, a song key, a song speed, a user ability setting, or the like.

The musical note association module 208 associates available music note selections for the gaming instrument controller 102 based on the accessing of the musical interaction recording 114.

The indication presentation module 210 presents the user reproduction indication in synchronization with the song. The presentation of the user reproduction indication may be based on a grouping of the song element selections and/or a presentation format request.

The musical note selection receiver module 212 receives musical note selections from the gaming instrument controller 102 based on presentation of the user reproduction indication and/or association of the available music note selections.

The setting access module 214 accesses an instrument setting associated with the gaming instrument controller 102. The instrument settings may include, by way of example, an instrument type, an instrument tone, a music effect, a pickup selection, a pickup type, or the like.

The length determination module 216 determines a selection length of a musical note selection. The speed determination module 218 determines a selection speed of a musical note selection. The pressure determination module 220 determines a selection pressure amount for a musical note selection.

The musical note generation module 222 generates musical notes for the song based on the receiving of the musical note selections, an instrument setting, the selection length, the selection speed, and/or the selection pressure amount. The instrumentation selection receiver module 224 receives a backing instrumentation selection for the backing audible portion.

The reproduction module 226 reproduces the backing audible portion and the musical notes. The reproduction of the backing audible portion may be based on the receiving of the backing instrumentation selection.

The recorder module 228 records the reproduction of the backing audible portion and the musical notes as a user participation song. The recording may include multiple instrumentation channels of a user participation song. A particular instrumentation channel of the multiple instrumentation channels may include the musical notes generated by the gaming instrument controller 102.

Figure 3:
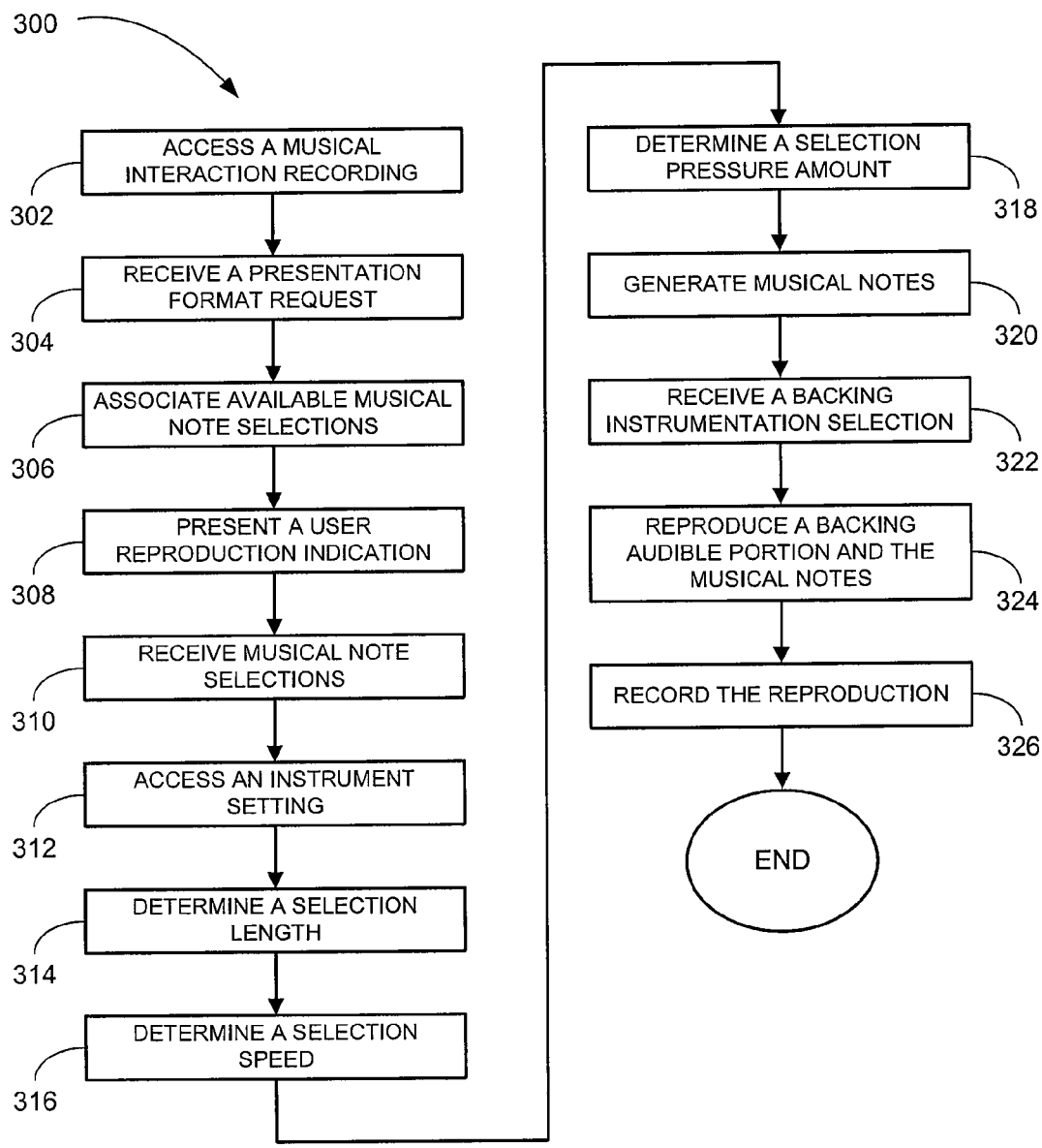
FIG. 3 is a flowchart illustrating a method for gaming instrument controller utilization according to example embodiments.

FIG. 3 illustrates a method 300 for gaming instrument controller utilization according to an example embodiment. The method 300 may be performed by the gaming instrument controller 102 and/or the gaming provider 106 of the system 100 (see FIG. 1) or otherwise performed.

The musical interaction recording 114 of a song is accessed at block 302. The musical interaction recording 114 may include a backing audible portion of the song and a user reproduction indication associated with the song. The user reproduction indication may include, by way of example, an audible user reproduction indication, a visual user reproduction indication, or the like. Other indications may also be used.

A presentation format request may be received for the musical interaction recording 114 at block 304. The presentation format request may include, by way of example a song key, a song speed, a user ability setting, or the like. The user ability setting may be used to alter the difficulty of the user reproduction indication based on an ability of a user of the gaming instrument controller 102. For example, an expert user may play a more challenging portion of a song (e.g., a guitar solo) while a novice user may play an easier portion of a song (e.g., a rhythm backing guitar during a guitar solo).

At block 306, available music note selections for the gaming instrument controller 102 may be associated based on the accessing of the musical interaction recording 114. The available music note selections may be, in an example embodiment, musical notes that are in key with the song. For example, the available music note selections may be based on a particular scale using during a portion of the song. The available music note selections may enable the user to participate using the gaming instrument controller 102 and generate a user participation song without having ability (e.g., equal ability or any ability) to play an actual instrument on which the gaming instrument controller 102 is based.

The user reproduction indication is presented in synchronization with the song at block 308. The presenting of the user reproduction indication may be in synchronization with the song is based on the receiving of the presentation format request.

In an example embodiment, the presentation of the user reproduction indication during the operations at block 308 may be based on grouping of song element selections. The song element selections may include, chorus, verse, bridge, or the like. For example, a number of song element selections may be received, an element order selection may be received, and the song element selections may be grouped together (e.g., based on the element order selection) to form a song order for the song. The grouping of song element selections may enable a user to remix or otherwise alter a song. For example, the user may add in an additional verse or use an alternate bridge for the song.

A number of musical note selections are received from the gaming instrument controller 102 based on presentation of the user reproduction indication and/or the association of the available music note selections at block 310.

An instrument setting associated with the gaming instrument controller 102 may be accessed at block 312. The instrument settings may include, by way of example, an instrument type, an instrument tone, a music effect, a pickup selection, a pickup type, or the like. For example, when the gaming instrument controller 102 is a guitar the instrument setting may include a guitar type (e.g., a FENDER STRATOCASTER guitar or a GIBSON LES PAUL guitar), a guitar tone, a guitar effect (e.g., distortion or chorus), a guitar pickup selection (e.g., neck pickup or a bridge pickup, a guitar pickup selection (e.g., a single coil pickup or a dual coil pickup), or the like.

A selection length of a particular musical note selection of the musical notes selections may be determined at block 314. The selection length may be a length of time in which a user operating the gaming instrument controller 102 has actuated a gaming actuator. The selection length may correspond to an amount of time for which a musical note is to be reproduced.

A selection speed of a particular musical note selection of the musical notes selections may be determined at block 316. The selection speed may be a speed of a user is actuating the gaming actuators of the gaming instrument controller 102. The selection speed may correspond to an amount of time between a musical note and an additional musical note or a pause (e.g., absence of a musical note).

A selection pressure amount for a particular musical note selection of the musical notes selections may be determined at block 318. The selection pressure amount may be a force by which a user operating the gaming instrument controller 102 has actuated a gaming actuator. The selection pressure amount may correspond to whether a volume of a musical note is to be reproduced relative to other musical notes in the user participation song.

Musical notes for the song are generated based on the receiving of the musical note selections, the instrument setting, selection length, selection speed and/or selection pressure amount at block 320.

A backing instrumentation selection may be received for the backing audible portion at block 322. The backing instrumentation selection may include a designation of the instruments and/or vocals for the backing audible portion. For example, a rhythm guitar section may back a user playing a guitar solo using the gaming instrument controller. The backing audible portion and the musical notes are reproduced at block 324.

The reproduction of the backing audible portion and the musical notes may be recorded as a user participation song at block 326. The reproduction of the backing audible portion may be based on the receiving of the backing instrumentation selection. The user participation song may be in MP3 format, WAV format, WMA format, or a different format. The user participation song may be reproduced as a dual channel stereo recording, a surround sound recording, as a multiple instrumentation channel recording, or may be otherwise reproduced.

In an example embodiment, the user participation song may be a multiple instrumentation channel recording. An instrumentation channel of the multiple instrumentation channels recording may be associated with musical notes generated by the gaming instrument controller 102. The multiple instrumentation channels may be used for mixing, remixing, or may be otherwise used.

Figure 4:
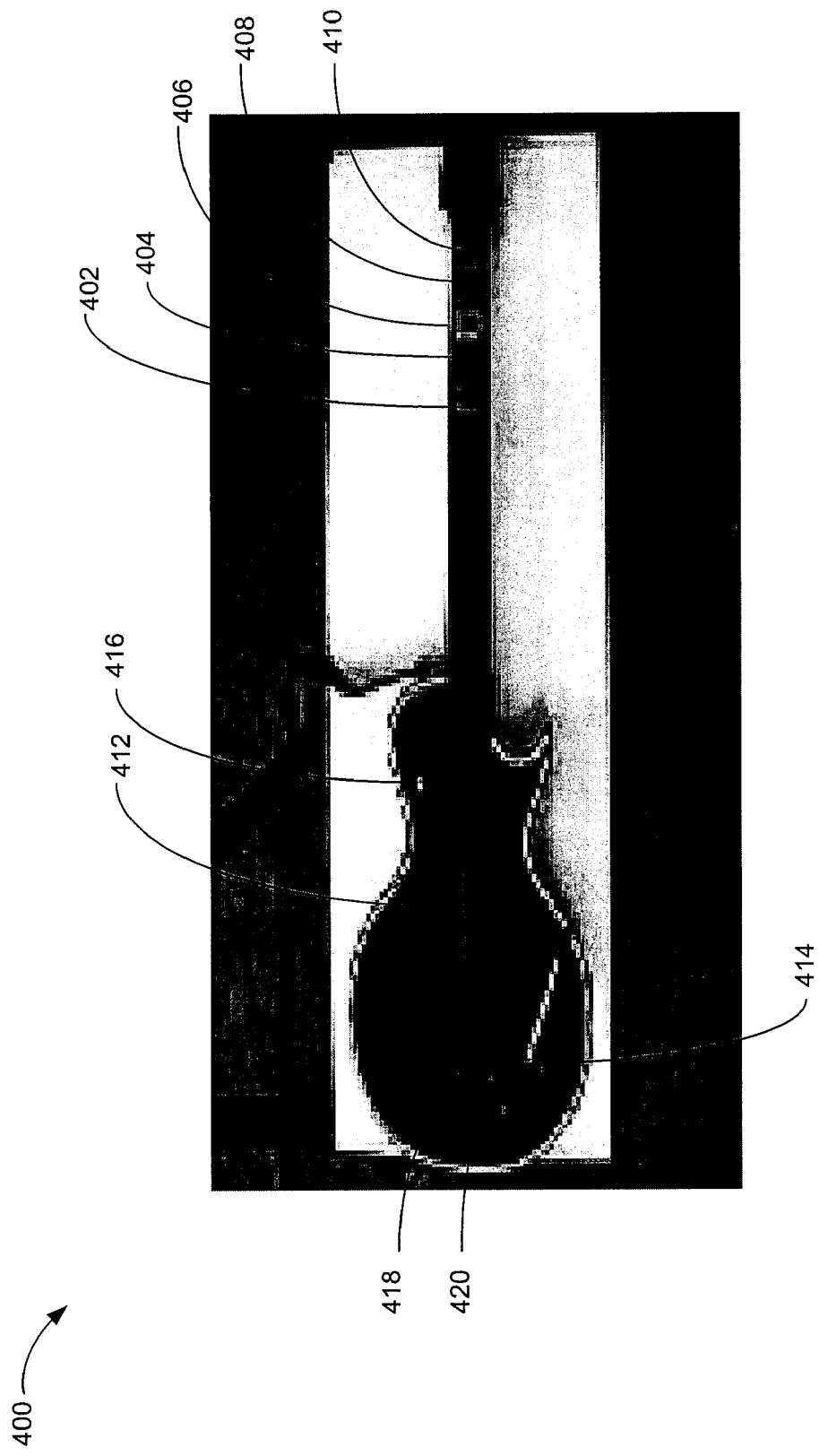
FIGS. 4 and 5 are example gaming instrument controllers that may be used in the system of FIG. 1 according to an example embodiment.

FIG. 4 illustrates an example gaming instrument controller 400 that may be deployed as the gaming instrument controller 102 in the system 100 (see FIG. 1) or may be otherwise deployed. The gaming instrument controller 400 may be configured and constructed to have an appearance and playability resembling a guitar.

The gaming instrument controller 400 may include a number of gaming actuators 402-414 and/or gaming selectors 416-420. However, a differing number or differing type of actuators and/or selectors may be included on the gaming instrument controller 400.

Gaming actuators 402-410 may correspond to different fingerings on a guitar neck. The gaming actuators 402-410 may be used to receive musical note selections, determine a selection length, determine a selection speed, and/or determine a selection pressure amount. A gaming actuator 412 may correspond to the use of a guitar pick on the strings of a guitar. The gaming actuator 412 may be used to receive musical note selections, determine a selection length, determine a selection speed, and/or determine a selection pressure amount in association with the gaming actuators 402-410 or independent from the gaming actuators 402-410. A gaming actuator 414 may correspond to a whammy bar on a guitar. The actuation of one or more gaming actuators 402-414 may each be used as input in generating the musical notes.

The gaming selectors 416-420 of the gaming instrument controller 400 may be used to alter an attribute associated with the generation of the musical notes. A gaming selector 416 may correspond to a pickup selector on a guitar, a gaming selector 418 may correspond to a tone control on the guitar, and a gaming selector 420 may correspond to a volume control on the guitar. However, the gaming selectors 416-420 may be otherwise used.

Figure 5:
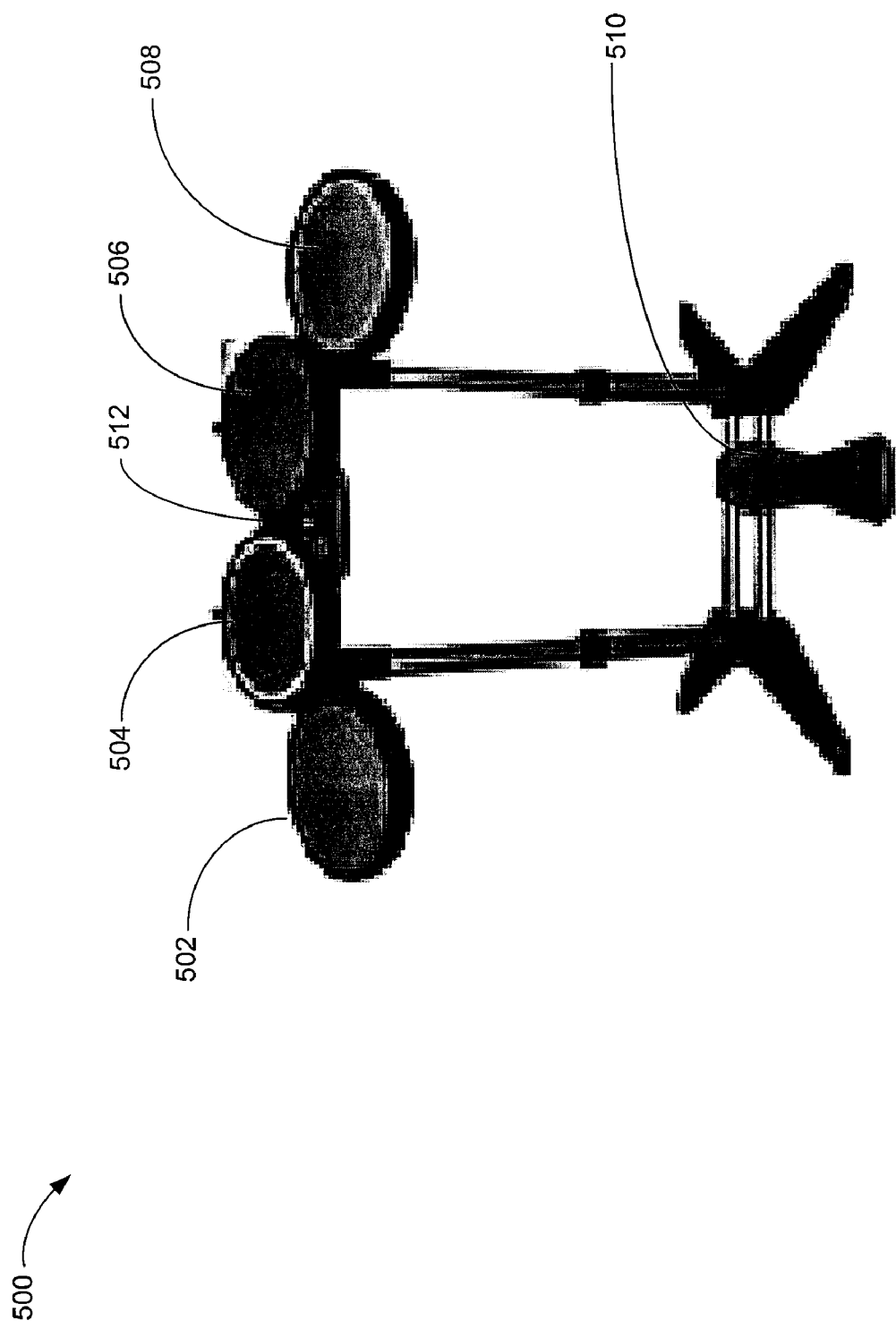

FIG. 5 illustrates an example gaming instrument controller 500 that may be deployed as the gaming instrument controller 102 in the system 100 (see FIG. 1) or may be otherwise deployed. The gaming instrument controller 500 may be configured and constructed to have an appearance and playability resembling a drum set.

The gaming instrument controller 500 may include a number of gaming actuators 502-510 and/or gaming selectors 512. However, a differing number or differing type of actuators and/or selectors may be included on the gaming instrument controller 500.

Gaming actuators 502-508 may correspond to drums on a drum set. The gaming actuators 502-508 may be used to receive musical note selections, determine a selection length, determine a selection speed, and/or determine a selection pressure amount. A gaming actuator 510 may correspond to the use of a pedal on a drum set (e.g., a kick pedal for a bass drum). The actuation of one or more gaming actuators 502-508 may each be used as input in generating the musical notes. The gaming selectors 512 of the gaming instrument controller 500 may be used to alter one or more attributes associated with the generation of the musical notes.

Figure 6:
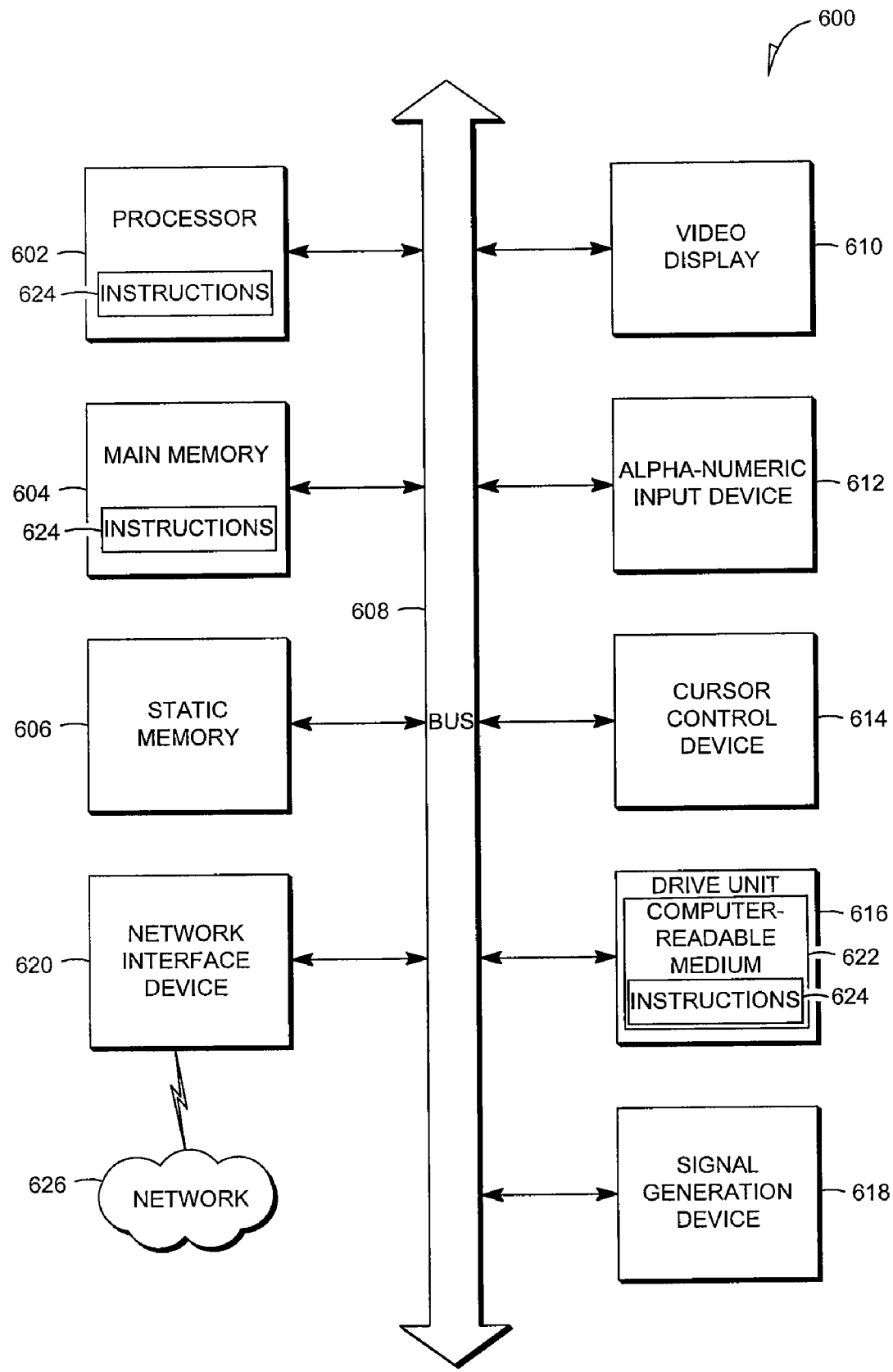
FIG. 6 is a block diagram diagrammatic representation of machine in the example form of a computer system within which a set of instructions for causing the machine to perform any one or more of the methodologies discussed herein may be executed.

FIG. 6 shows a diagrammatic representation of machine in the example form of a computer system 600 within which a set of instructions may be executed causing the machine to perform any one or more of the methods, processes, operations, or methodologies discussed herein. The gaming provider 106 may operate on or more computer systems 600. The gaming instrument controller 102 may include the functionality of one or more computer systems 600.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a drive unit 616, a signal generation device 618 (e.g., a speaker) and a network interface device 620.

The drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may farther be transmitted or received over a network 626 via the network interface device 620.

The software 624 may further include software that utilizes MIDI protocols to create and reproduce music in a computer. The gaming instrument controller 102 may produce signals that are converted to control signals that use MIDI modeling of a string instrument to reproduce accurate reproductions of real stringed instruments based on input from the controller and mapping of those inputs to stored models of the stringed instruments. The software recreates the characteristics of the strings, body, frets, fingers and pickups, as well as how the string is played, for example, with a pick, bow or hammer, all based on the input from the gaming instrument controller 102. MIDI protocols allow the user with the gaming instrument controller 102 to change individual notes in a song or produce sounds of different instruments. The MIDI protocols represent each instrument in a MIDI performance separate from other instruments. Thus, the user can isolate individual instruments. Thus, the user can remove or mute individual instruments in a song such that the user can play that part or change that part of the song. Any song created by the user in the MIDI protocol can be moved to other MIDI compliant systems.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for utilizing a gaming instrument controller have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
accessing a musical interaction recording of a song, the musical interaction recording including a backing audible portion of the song and a user reproduction indication associated with the song;
presenting the user reproduction indication in synchronization with the song;
receiving a plurality of musical note selections from a gaming instrument controller based on the presenting of the user reproduction indication, the plurality of musical note selections includes a note changed from an original note in the song;
generating a plurality of musical notes for the song based on the receiving of the plurality of musical note selections; and
reproducing the backing audible portion and the plurality of musical notes in a user participation song that may include different notes than notes in the original song.

2. The method of claim 1, further comprising:
recording the reproducing of the backing audible portion and the plurality of musical notes as a user participation song.

3. The method of claim 1, further comprising:
recording the reproducing of the backing audible portion and the plurality of musical notes as a plurality of instrumentation channels for a user participation song, a particular instrumentation channel of the plurality of instrumentation channels associated including the plurality of musical notes generated by the gaming instrument controller.

4. The method of claim 1, further comprising:
accessing an instrument setting associated with the gaming instrument controller;
wherein the generating the plurality of musical notes is based on the receiving of the plurality of musical note selections and the instrument setting.

5. The method of claim 4, wherein the instrument setting includes an instrument type, an instrument tone, a music effect, a pickup selection, a pickup type, or combinations thereof.

6. The method of claim 1, further comprising:
determining a selection length of a particular musical note selection of the plurality of musical notes selections,
wherein the generating of the plurality of musical notes for the song is based on the receiving of the plurality of musical note selections and the determining of the selection length.

7. The method of claim 1, further comprising:
determining a selection speed of a particular musical note selection of the plurality of musical notes selections,
wherein the generating of the plurality of musical notes for the song is based on the receiving of the plurality of musical note selections and the determining of the selection speed.

8. The method of claim 1, further comprising:
determining a selection pressure amount for a particular musical note selection of the plurality of musical notes selections,
wherein the generating of the plurality of musical notes for the song is based on the receiving of the plurality of musical note selections and the determining of the selection pressure amount.

9. The method of claim 1, further comprising:
associating a plurality of available music note selections for the gaming instrument controller based on the accessing of the musical interaction recording,
allowing a selection from the plurality of available music note selections that include notes other than those in the song,
wherein the receiving of the plurality of musical note selections from the gaming instrument controller is based on the associating of the plurality of available music note selections and the presenting of the musical interaction recording.

10. The method of claim 1, further comprising:
receiving a plurality of song element selections; and
grouping the plurality of song element selections together to form a song order for the song;
wherein the presenting of the user reproduction indication is based on the grouping of the plurality of song element selections.

11. The method of claim 10, further comprising:
receiving an element order selection,
wherein the grouping of the plurality of song element selections is based on the receiving of the element order selection.

12. The method of claim 1, further comprising:
receiving a presentation format request for the musical interaction recording,
wherein the presenting of the user reproduction indication in synchronization with the song is based on the receiving of the presentation format request.

13. The method of claim 12, wherein the presentation format request includes a song key, a song speed, a user ability setting, or combinations thereof.

14. The method of claim 1, further comprising:
receiving a backing instrumentation selection for the backing audible portion,
wherein the reproducing of the backing audible portion is based on the receiving of the backing instrumentation selection.

15. The method of claim 1, wherein the gaming instrument controller includes a gaming guitar controller, a gaming bass controller, a gaming drum controller, a gaming violin controller, or a gaming saxophone controller.

16. The method of claim 1, wherein the user reproduction indication includes an audible user reproduction indication, a visual user reproduction indication, or combinations thereof.

17. The method of claim 1, wherein receiving of the plurality of musical note selections comprises:
changing the musical scale based on the physical position of the gaming instrument controller.

18. A machine-readable medium comprising instructions, which when implemented by one or more processors perform the following operations:
access a musical interaction recording of a song, the musical interaction recording including a backing audible portion of the song and a user reproduction indication associated with the song;
present the user reproduction indication in synchronization with the song;
receive a plurality of musical note selections from a gaming instrument controller based on presentation of the user reproduction indication;
generate a plurality of musical notes for the song based on receipt of the plurality of musical note selections that include a note changed from an original note in the song; and
reproduce the backing audible portion and the plurality of musical notes.

19. The machine-readable medium of claim 18 further comprising instructions, which when implemented by one or more processors perform the following operations:
record reproduction of the backing audible portion and the plurality of musical notes as a user participation song.

20. A system comprising:
a recording access module to access a musical interaction recording of a song, the musical interaction recording including a backing audible portion of the song and a user reproduction indication associated with the song;
an indication presentation module to present the user reproduction indication in synchronization with the song;
a musical note selection receiver module to receive a plurality of musical note selections from a gaming instrument controller based on presentation of the user reproduction indication by the indication presentation module, the musical note selection receiver module is to allow a note to be changed from an original note of the song;
a musical note generation module to generate a plurality of musical notes for the song based on receipt of the plurality of musical note selections by the musical note selection receiver module; and
a reproduction module to reproduce the backing audible portion accessed by the recording access module and the plurality of musical notes generated by the musical note generation module.

21. The system of claim 20, further comprising:
a setting access module to access an instrument setting associated with the gaming instrument controller;
a length determination module to determine a selection length of a particular musical note selection of the plurality of musical notes selections,
a speed determination module to determine a selection speed of a particular musical note selection of the plurality of musical notes selections,
a pressure determination module to determine a selection pressure amount for a particular musical note selection of the plurality of musical notes selections,
wherein generating of the plurality of musical notes by the musical note generation module is based on the receiving of the plurality of musical note selections, the instrument setting, the selection length, the selection speed, and the selection pressure amount.

* * * * *